United States Patent
Vuorensola et al.

(10) Patent No.: US 12,306,894 B2
(45) Date of Patent: May 20, 2025

(54) SYSTEMS AND METHODS FOR BIDIRECTIONAL COMMUNICATION WITHIN A WEBSITE DISPLAYED WITHIN A MOBILE APPLICATION

(71) Applicant: Spotify AB, Stockholm (SE)

(72) Inventors: Lauri Johannes Vuorensola, Espoo (FI); Javier Moscardó Marichalar, New York, NY (US); Jia-Ming Yuan, New York, NY (US); Eric Donald Madar, Oakland, CA (US); Joseph Levin, New York, NY (US); Ercan Erden, Palm Coast, FL (US); Thomas Brunoli, New York, NY (US); Alexander John Kurihara, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/821,334

(22) Filed: Aug. 22, 2022

(65) Prior Publication Data

US 2023/0325450 A1 Oct. 12, 2023

Related U.S. Application Data

(60) Provisional application No. 63/329,632, filed on Apr. 11, 2022.

(51) Int. Cl.
*G06F 16/954* (2019.01)
*G06F 3/0484* (2022.01)
(Continued)

(52) U.S. Cl.
CPC .......... *G06F 16/954* (2019.01); *G06F 3/0484* (2013.01); *G06F 16/435* (2019.01); *G06F 16/4387* (2019.01)

(58) Field of Classification Search
None
See application file for complete search history.

(56) References Cited

U.S. PATENT DOCUMENTS 8,997,081 B1 * 3/2015 Manion ............... G06F 8/71
717/168
10,104,172 B1 * 10/2018 Demsey ............... H04L 69/04
(Continued)

FOREIGN PATENT DOCUMENTS

EP 2908499 A1 8/2015

OTHER PUBLICATIONS

Vuorensola, "Declaration of Lauri Johannes Vuorensola Regarding Use of Prototype Prior to Filing Date", U.S. Appl. No. 17/821,334, filed Sep. 1, 2023, 4 pgs.

*Primary Examiner* — Mandrita Brahmachari
(74) *Attorney, Agent, or Firm* — Morgan, Lewis & Bockius LLP

(57) ABSTRACT

A method is performed at an electronic device. The method includes displaying, in a mobile application provided by a media content provider, a user interface that includes one or more media content items. The method further includes displaying, within a browser displayed within the mobile application, external content that is associated with a content provider distinct from the media content provider, including displaying a first set of controls within the external content. The method includes, while displaying the external content, receiving a first user input selecting a first control of the first set of controls and, in response to the first user input selecting the first control, sending a command to the mobile application to perform an action and performing, by the mobile application, the action corresponding to the first control.

17 Claims, 9 Drawing Sheets

(51) Int. Cl.
    *G06F 16/435*     (2019.01)
    *G06F 16/438*     (2019.01)

(56) References Cited

U.S. PATENT DOCUMENTS

| | | | |
|---|---|---|---|
| 11,435,876 B1* | 9/2022 | Kakati | G06F 9/451 |
| 2005/0038819 A1* | 2/2005 | Hicken | G11B 27/11 |
| 2006/0195790 A1* | 8/2006 | Beaupre | H04N 21/8113 |
| | | | 706/18 |
| 2008/0271078 A1* | 10/2008 | Gossweiler | H04N 21/47 |
| | | | 725/40 |
| 2009/0119589 A1* | 5/2009 | Rowell | G06F 3/0485 |
| | | | 715/716 |
| 2012/0072960 A1 | 3/2012 | Rosenberg et al. | |
| 2012/0210205 A1* | 8/2012 | Sherwood | H04N 21/6175 |
| | | | 715/234 |
| 2013/0045778 A1 | 2/2013 | Sundaresan et al. | |
| 2014/0035831 A1* | 2/2014 | Fino | G06F 3/04883 |
| | | | 345/173 |
| 2015/0026718 A1* | 1/2015 | Seyller | H04N 21/854 |
| | | | 725/34 |
| 2015/0046848 A1* | 2/2015 | Vohra | H04M 1/72436 |
| | | | 715/760 |
| 2015/0066708 A1* | 3/2015 | Masuda | G06Q 30/0641 |
| | | | 705/27.1 |
| 2015/0095160 A1 | 4/2015 | Ma | |
| 2016/0366121 A1* | 12/2016 | Rykowski | H04L 63/0815 |
| 2018/0075483 A1* | 3/2018 | Boyarshinov | G06Q 30/0255 |
| 2020/0053184 A1* | 2/2020 | Roberts, Jr. | H04L 67/306 |
| 2020/0151212 A1* | 5/2020 | Li | G06F 3/165 |
| 2020/0257490 A1* | 8/2020 | McKently | H04N 21/458 |
| 2020/0380029 A1* | 12/2020 | Chen | G06F 16/64 |

* cited by examiner

600

602 Display, in a mobile application provided by a media content provider, a user interface that includes one or more media content items.

604 Displaying the user interface in the mobile application includes displaying one or more controls for controlling playback of the one or more media content items.

606 The one or more controls comprise sharing controls for sharing a media content item provided by the media content provider.

608 The one or more controls comprise a control for marking a media content item as a favorite, and the mobile application stores, in a user profile, the media content item as a favorite.

610 Display, within a browser displayed within the mobile application, external content that is associated with a content provider distinct from the media content provider, including displaying a first set of controls within the external content.

612 The content provider selects the first set of controls to be displayed within the external content from a library of controls provided by the media content provider distinct from the content provider.

614 The first set of controls comprises a set of playback controls for controlling playback, of a media content item provided by the media content provider.

616 The first set of controls corresponds to a set of actions executed by the mobile application.

702 Display, in a mobile application provided by a media content provider, a user interface that includes one or more media content items.

704 Display, within a browser displayed within the mobile application, a webpage that includes content and a first set of controls.

706 While displaying the webpage, receive a first user input selecting a first control of the first set of controls.

708 In response to the first user input selecting the first control, sending a command to the mobile application to perform an action.

710 Perform, by the mobile application, the action corresponding to the first control.

FIG. 7

SYSTEMS AND METHODS FOR BIDIRECTIONAL COMMUNICATION WITHIN A WEBSITE DISPLAYED WITHIN A MOBILE APPLICATION

PRIORITY APPLICATION

This application claims priority to U.S. Prov. App. No. 63/329,632, filed Apr. 11, 2022, which is hereby incorporated by reference in its entirety.

TECHNICAL FIELD

The disclosed embodiments relate generally to media provider systems, and, in particular, to displaying content from a website within a mobile application (e.g., a media application) without leaving the mobile application.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, users create and select playlists to easily organize and access media items, including playlists curated by the users themselves and playlists curated by other parties, such as content providers.

SUMMARY

In the disclosed embodiments, systems and methods are provided for displaying content from an external website within a mobile application without leaving the mobile application (e.g., within a Webview). While the content from the external website is displayed, a user of the mobile application is enabled to interact with the website (e.g., using controls provided by the website) so as to control native functions of the mobile application, thus enabling bi-directional communication between the mobile application and the website. The content of the external website is displayed in a way that it looks integrated in the mobile application. The mobile application is also enabled to obtain data from user interactions with the content from the external website, thus improving data collection by keeping the user within the mobile application's environment.

To that end, in accordance with some embodiments, a method performed at an electronic device is provided. The method includes displaying, in a mobile application provided by a media content provider, a user interface that includes one or more media content items. The method further includes displaying, within a browser displayed within the mobile application, external content that is associated with a content provider distinct from the media content provider, including displaying a first set of controls within the external content. The method includes, while displaying the external content, receiving a first user input selecting a first control of the first set of controls and, in response to the first user input selecting the first control, sending a command to the mobile application to perform an action and performing, by the mobile application, the action corresponding to the first control.

In some embodiments, a similar approach may be used for content within a media-providing service, e.g., by incorporating infrequently used user interfaces through a browser window within the application. For example, the media-providing service may provide a "Year in Review" feature summarizing the songs, artists, and other content that a user listened to most frequently in the past year. Rather than designing a user interface for such infrequently used features and incorporating the user interface directly into the application, some embodiments of the present disclosure provide such features via a webpage, which is launched in a browser within the media application (e.g., a Webview), and through which bi-directional communication is exchanged between the webpage and media application. This converts the more difficult task of incorporating a user interface into an application to the easier task of loading a webpage. In some embodiments, the look and feel of the browser within the media application as well as the webpage match the user interface, such that the user is not aware that a webpage is displayed (rather than the application itself).

To that end, in accordance with some embodiments, a method performed at an electronic device is provided. The method includes displaying, in a mobile application provided by a media content provider, a user interface that includes one or more media content items. The method further includes displaying, within a browser displayed within the mobile application, a webpage that includes content and a first set of controls (e.g., the first set of controls are part of the webpage). The method includes, while displaying the webpage, receiving a first user input selecting a first control of the first set of controls and, in response to the first user input selecting the first control, sending a command to the mobile application to perform an action and performing, by the mobile application, the action corresponding to the first control.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for displaying external content within a mobile application (e.g., with bi-directional communication between the external content and the mobile application).

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 6A-6B are flow diagrams illustrating a method of performing actions in a mobile application from commands generated within external content, in accordance with some embodiments.

FIG. 7 is a flow diagram illustrating a method of method of performing actions in a mobile application from commands generated within a microsite displayed within the mobile application, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
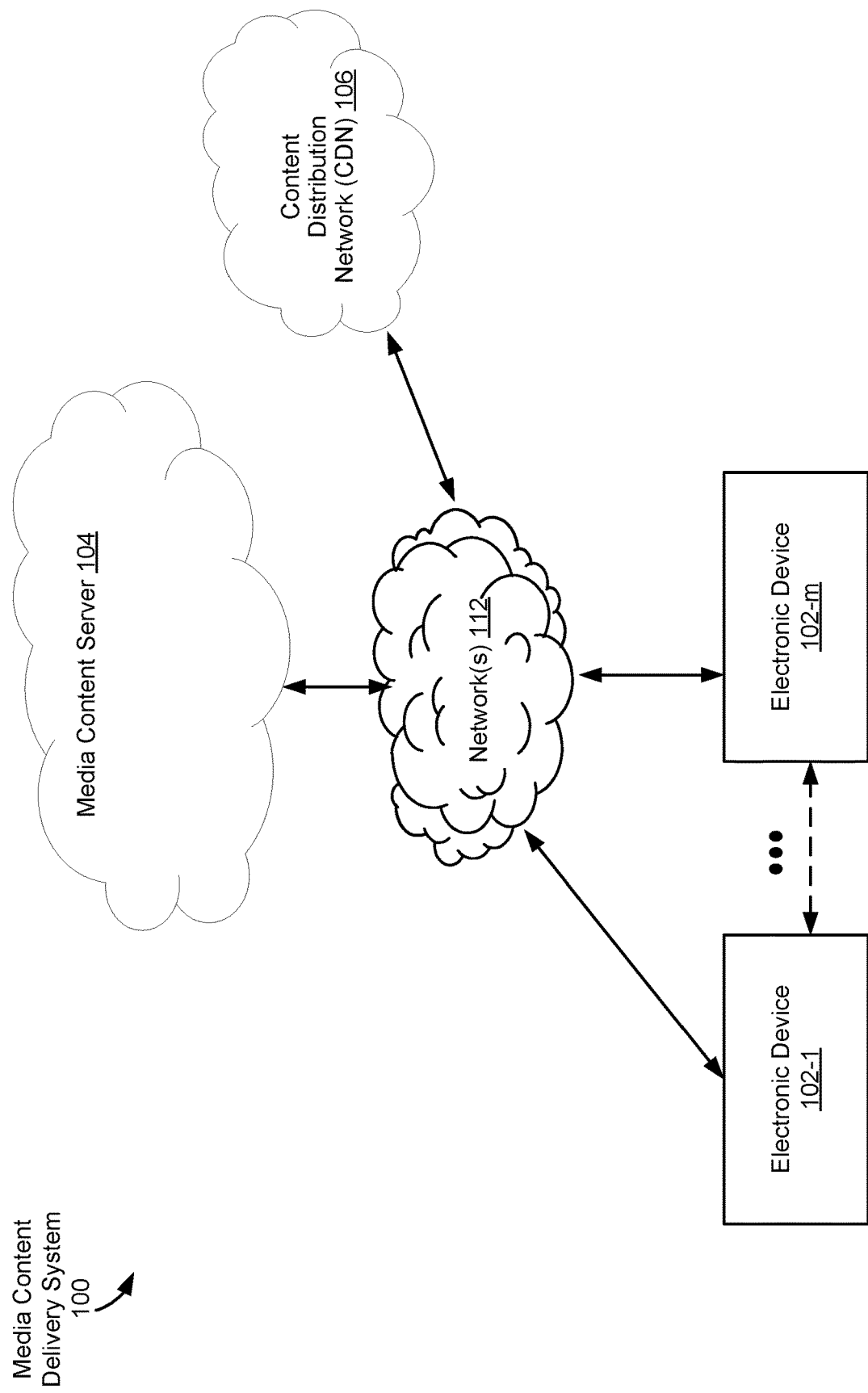
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more different types of devices.

In some embodiments, electronic devices 102-1 and 102-$m$ send and receive media-control information through network(s) 112. For example, electronic devices 102-1 and 102-$m$ send media control requests (e.g., requests to play music, podcasts, movies, videos, or other media items, or playlists thereof) to media content server 104 through network(s) 112. Additionally, electronic devices 102-1 and 102-$m$, in some embodiments, also send indications of media content items to media content server 104 through network(s) 112. In some embodiments, the media content items are uploaded to electronic devices 102-1 and 102-$m$ before the electronic devices forward the media content items to media content server 104.

In some embodiments, electronic device 102-1 communicates directly with electronic device 102-$m$ (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-$m$. In some embodiments, electronic device 102-1 communicates with electronic device 102-$m$ through network(s) 112. In some embodiments, electronic device 102-1 uses the direct connection with electronic device 102-$m$ to stream content (e.g., data for media items) for playback on the electronic device 102-$m$.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
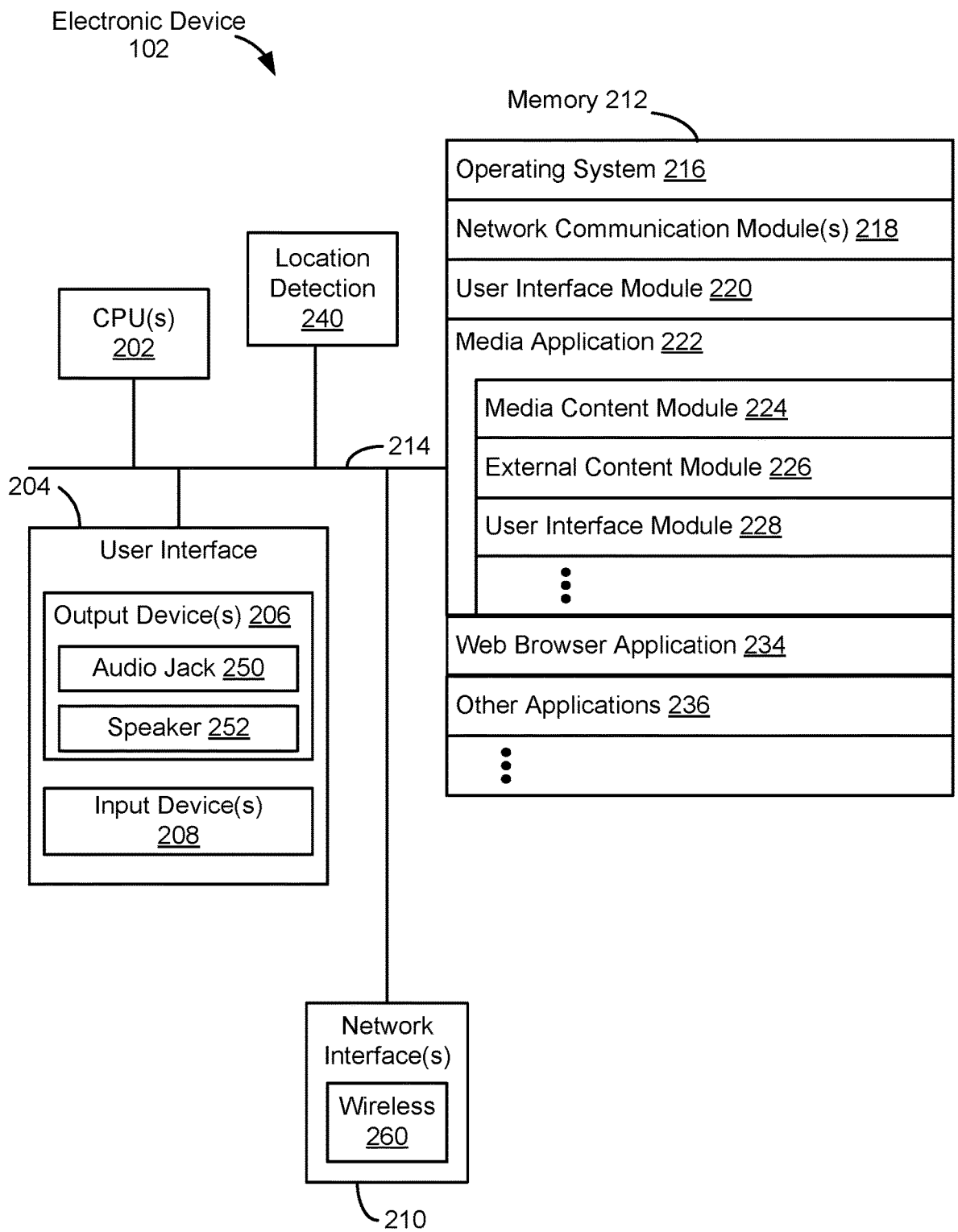
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content module 224 for storing sets of media items for playback, the media items selected by the user (e.g., for a user-curated playlist) and/or the media items curated without user input (e.g., by the media content provider);
  - an external content module 226 for displaying external content for the user. In some embodiments, the external content module 226 communicates with the media content server to obtain instructions for the external content to provide to the user;
  - a user interface module 228 for displaying a user interface of the media application 222, and for displaying external content within the user interface of the media application 222. In some embodiments, the external content is displayed with a look and feel that matches the look and feel of the user interface of the media application 222;
- a web browser application 234 for accessing, viewing, and interacting with web sites. In some embodiments, the web browser application 234 is launched in response to a user interaction with external content that is displayed within the media application (e.g., user inputs within media application 222 initiates a session in the web browser application 234); and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
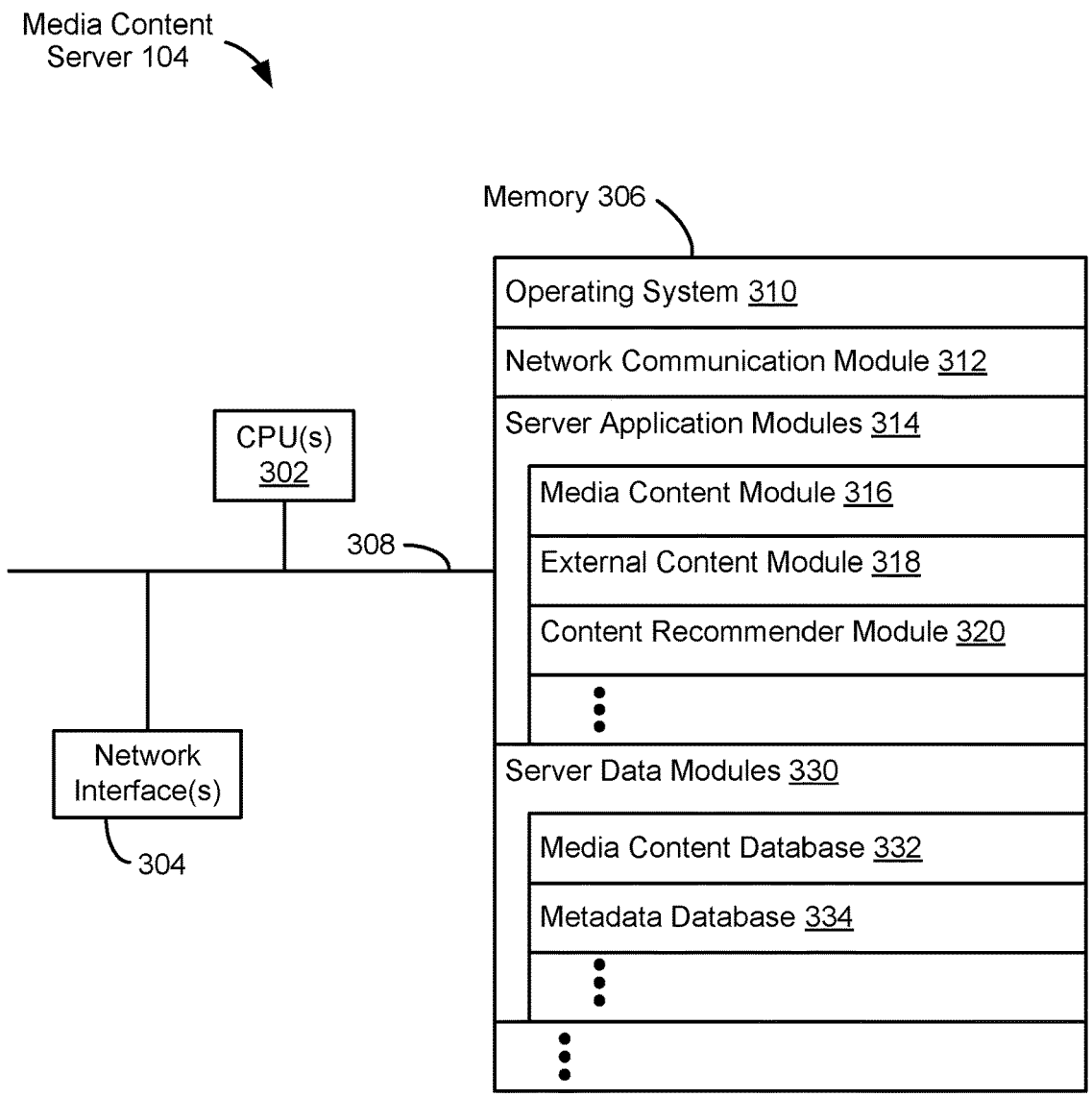
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - an external content module 318 for storing and/or providing (e.g., streaming) sets of external media content items to the electronic device. In some embodiments, external content module 318 selects the external content to provide to the electronic device;
  - a content recommender module 320 for determining and/or providing recommendations for external content to provide to the electronic device;
- one or more server data module(s) 330 for handling the storage of and/or access to media items and/or metadata relating to the media items; in some embodiments, the one or more server data module(s) 330 include:
  - a media content database 332 for storing media items; and
  - a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4B:
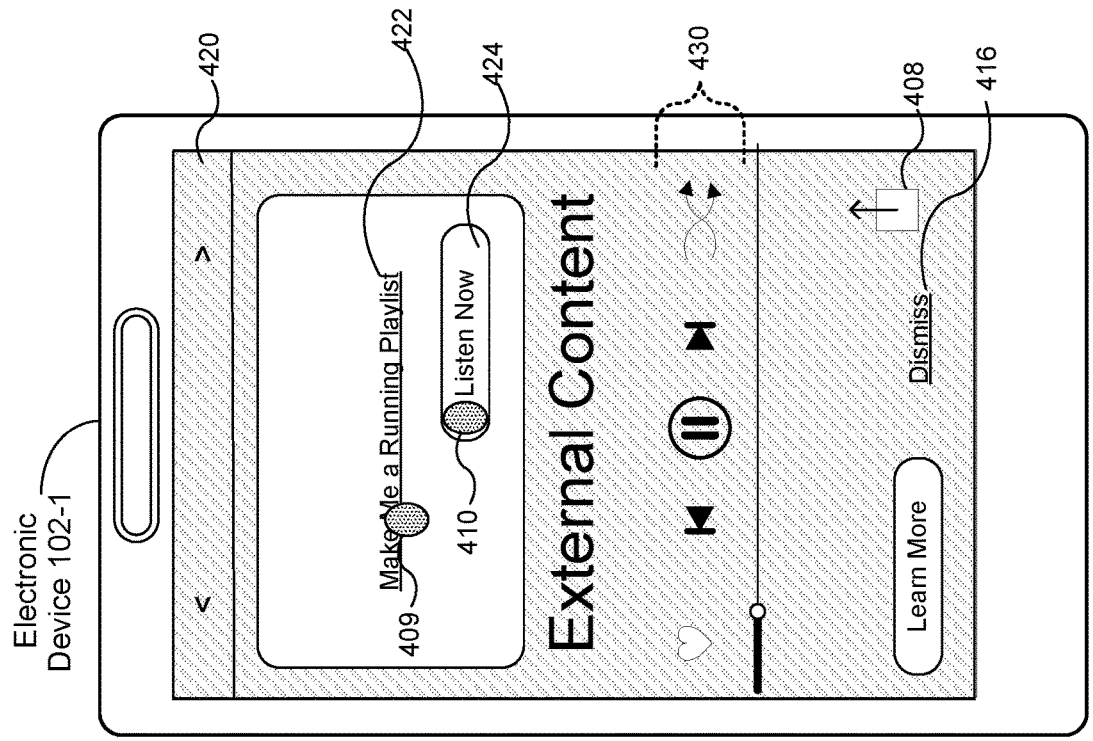
FIG. 4A-4D are block diagrams illustrating user interfaces for displaying external content within a media application, in accordance with some embodiments.
Figure 4A:
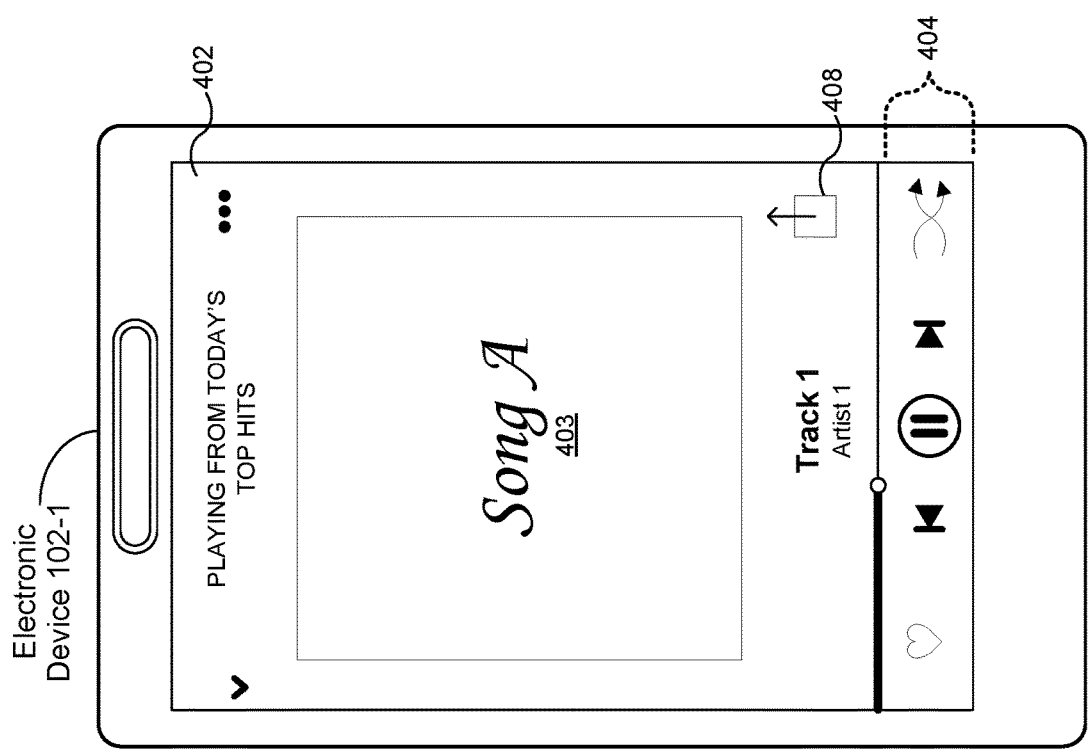

FIGS. 4A-4D are example user interfaces for displaying a playlist on an electronic device 102-1. FIG. 4A illustrates a currently playing view 402 for a first media content item ("Track 1" by "Artist 1"). In some embodiments, the first media content item is a media content item that is currently playing back, on the electronic device 102-1 or on another electronic device 102-m (e.g., a presentation device that is distinct from the electronic device 102-1, such as a speaker system). In some embodiments, the first media content item is provided by the media content provider associated with the media application (e.g., the same provider that provides the media application and its user interfaces). For example, the media application for the media content provider is in communication with a server system of the media content provider, such that content items (e.g., stored at the server system of the media content provider, or a CDN associated with the media content provider) are presented (e.g., streamed) to the electronic device 102-1 (e.g., or other presentation device communicatively coupled to electronic device 102-1) that is executing the media application.

In some embodiments, the currently playing view 402 includes an indication of the first media content item (e.g., a title, artist, album, channel, or other information) and a plurality of controls 404 for controlling playback of the first media content item. For example, the plurality of controls 404 include a control for marking the first media content item as a favorite (e.g., "heart"), skipping to a previous media content item within a playback queue, pausing (e.g., or playing) the first media content item, skipping to a next media content item within the playback queue, and shuffling a playback order of media content items in the playback queue. In some embodiments, a sharing control 408 is also provided, which enables the user to share (e.g., via social media, messaging, email, or device-to-device WiFi) an indication (e.g., a URL) for the first media content item. In some embodiments, the currently playing view 402 further displays image and/or video content 403 (e.g., cover art and/or a music video) associated with the first media content item.

In some embodiments, the media application operates in two modes, a premium version (e.g., a paid version) and a free version, depending on a user account logged into the media application. In some embodiments, in one of the modes (e.g., the free version), one or more additional media content items (e.g., advertisements) are presented to the user in addition to media content items in the playback queue. In some embodiments, the one or more additional media content items are presented to the user in both modes (e.g., regardless of whether the media application is operating as the paid version or the free version). For example, during playback of a podcast episode (or audiobook), an additional media content item may be presented between a determined change in topic (or chapter) of the podcast or audiobook.

In some embodiments, the one or more additional media content items are associated with and/or provided by an external content provider that is distinct from the media content provider associated with the media application. For example, the one or more additional media content items are external content items. In some embodiments, the external content items are automatically, without user input, presented (e.g., displayed and/or played back) to the user. For example, the external content items are automatically presented between playback of two media content items from the media content provider. In some embodiments, the external content items are automatically presented within a media content item. For example, during a podcast, an external content item is presented to the user during a predetermined break of the podcast. In some embodiments, the predetermined break is identified by the publisher (e.g., content creator) of the media content item. In some embodiments, the predetermined break is identified by the media content provider (e.g., by determining a change in topic and/or speaker). In some embodiments, the predetermined break is determined based on a time threshold (e.g., external content is presented at predefined intervals, such as every 10 minutes).

In some embodiments, the one or more additional media content items are provided by a plurality of external content providers. For example, different companies each provide one or more external content items. In some embodiments, the media content provider selects which external content to provide to the user. For example, the media content provider, using a playback history of the user and/or user profile information selects which external content item to provide to the user.

In some embodiments, the external content item is stored at an external content server 502, as described with reference to FIG. 5. In some embodiments, the media application updates the user interface from the currently playing view 402 to an external content view 420. In some embodiments, the external content view 420 is provided within the media application (e.g., without launching a separate web browser). In some embodiments, the external content view 420 is a launched in a browser window within the media application (e.g., a WebView) (e.g., a browser engine contained within the media application).

In some embodiments, the external content view 420 is designed by an external content provider (e.g., distinct from the media content provider). In some embodiments, the external content view 420 includes one or more controls 430 for controlling playback of content provided by the media content provider (e.g., controlling content within the media application). For example, controls 430 in external content view 420 include one or more of the same controls from the plurality of controls 404 that are provided in the currently playing view 402. In some embodiments, controls 430 have a subset, less than all, and/or additional controls, as compared to the plurality of controls 404 that are provided in other user interfaces provided by the media application. As such, external content provides one or more controls that communicate with, and control media playback of, the media application. For example, a "dismiss" control is provided, wherein in response to selection of dismiss control 416, the media application closes the external content view 420 and returns to the currently playing view 402 (or whatever view was displayed immediately prior to displaying the external content view).

In some embodiments, the external content provider uses tools from the media content provider to design the external content view 420, such that the external content view 420 has a look and feel that is consistent with the look and feel of the views of the media application. For example, the external content provider is given access to color palettes, templates, control options, font options, and other design tools from the media content provider. In some embodiments, the external content view 420 is stored at a server system of the external content provider (e.g., and not by a server system of the media content provider). In some embodiments, the external content view 420 is optionally stored by a server system of the media content provider. As such, a distinct external content provider controls the external content, but interactions with the external content cause the media application associated with the media content provider to perform one or more actions.

In some embodiments, the external content provider is given a set of control options (e.g., from the media content provider) and the external content provider is enabled to select which controls from the set of control options to include in the external content view 420. In some embodiments, the external content provider is further enabled to design the external content to display the controls at various portions of the user interface. For example, although control 430 include the same set of controls as plurality of controls 404, the controls 430 are displayed in a different portion of the user interface than controls 404. The external content provider is also enabled to select alternative and/or additional controls than the controls provided by the media content provider. For example, in FIG. 4B, the external content provider (e.g., an athletic gear company) is providing a running playlist, and includes a control for the user to request to listen to the running playlist directly from the user interface of the external content.

In some embodiments, one or more control options that are displayed cause the electronic device 102-1 to initiate an external application. For example, the "Learn More" control causes the electronic device 102-1 to launch a web browser for displaying a webpage that includes additional information about the external content (or external content provider).

In some embodiments, the external content view 420 presents, to the user, an option to generate one or more content items (e.g., a playlist) associated with the external content provider. For example, the external content provider provides a control 422 to "Make Me a Running Playlist" that is associated with the external content provider. In some embodiments, the media items included in the "Running Playlist" are curated and/or provided by the media content provider. For example, in response to user input 409 that selects control 422, the media provider associated with the media application curates the running playlist, and provides the media content items that are included in the running playlist (e.g., wherein the user can access the curated Running Playlist in the user's library of playlist (which include playlist 411-1 through 411-4), illustrated in FIG. 4D). For example, the Running Playlist 411-4 is associated with an athletic-wear company (e.g., external content provider) that designs and/or provides the external content view 420, and is associated with a "running playlist" that is curated by the media content provider in response to the user input 409.

In some embodiments, the generated one or more content items that are associated with the external content provider are personalized for the user. For example, the one or more content items are selected, by the media content provider, for the user based on information the media content provider has stored for the user. For example, the media content provider uses profile information and/or a playback history of the user to select content items that match the user's taste. In some embodiments, the external content provider does not need access to the user's credentials for the media application. For example, because the external content view 420 sends commands directly to the media application, whereby the media application executes the commands, there is no need for the external content provider to request information about the user.

In some embodiments, a control 424 is provided such that the user is enabled to directly access the running playlist from the displayed external content (e.g., WebView). For example, the "Listen Now" control 424 is provided by the external content provider, and in response to a user input 410 selecting control 424, a command is sent to the media application (e.g., and/or the server system associated with the media provider of the media application), and the media application performs an action in accordance with the command. For example, in FIG. 4B, in response to user input 410 selecting control 424, the media application displays the user interface illustrated in FIG. 4C, e.g., which is no longer part of a browser window), and which corresponds to the "Running Playlist" that the user requested to "Listen Now." The user interface illustrated in FIG. 4C lists various media items 406 that have been included in the playlist (e.g., media item 406-1 through media item 406-4). Accordingly, user interactions with user interface elements of the external content (displayed within a browser window in the application) cause the media application to perform one or more actions (e.g., and display a user interface that is not displayed in a browser window).

Figure 4D:
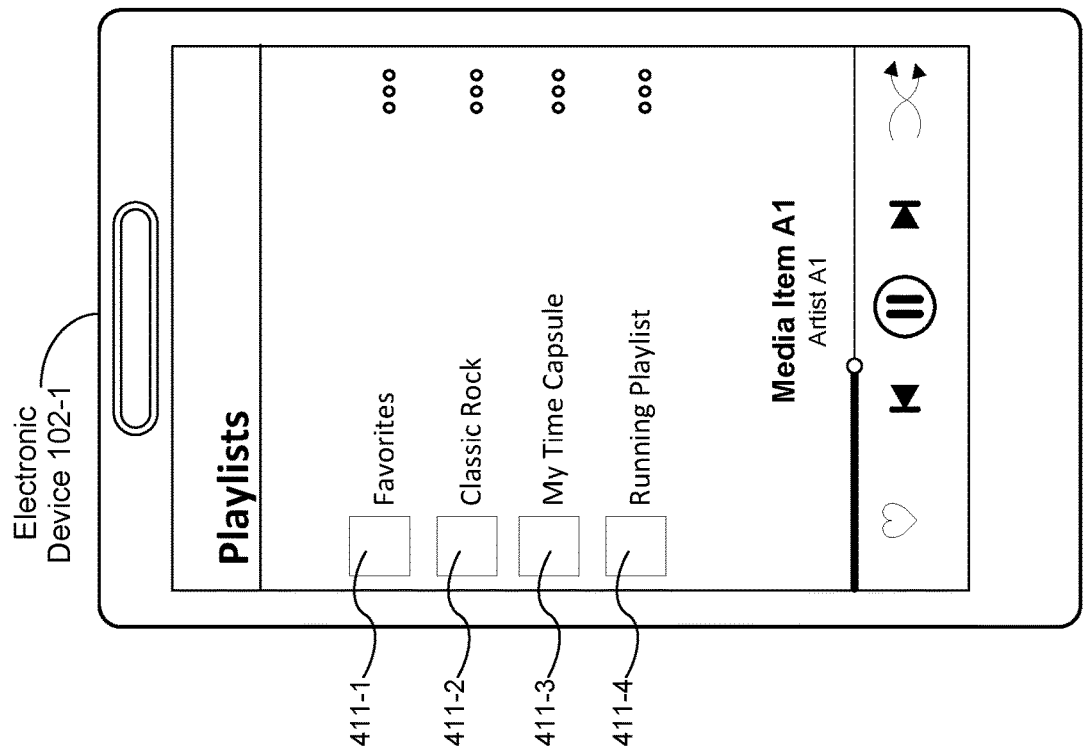

In some embodiments, in accordance with a determination that the user has interacted with the external content 420, the media application automatically adds one or more media content items to a library of the user. For example, in accordance with a determination that the user has selected "Listen Now" control 424, or another control (e.g., that indicates positive interaction), such as selecting the add to favorites (e.g., heart) control in the set of controls 430, the running playlist is added to the library of the user. For example, as illustrated in FIG. 4D, "Running Playlist" is displayed in the user interface with additional playlists that are in the library of the user. As such, the user is enabled to access the Running Playlist, that is associated with the external content provider, from the media application after the external content 420 is no longer displayed.

In some embodiments, in accordance with a determination that the user has not interacted (e.g., positively) with the external content 420 (e.g., the user selects "dismiss" control 416 without any other interactions), the media application does not store external content associated with the external content provider in the library of the user.

It should be understood that, although FIGS. 4A-4D describe touch inputs on virtual affordances (e.g., controls) to cause the electronic device to perform operations described herein, in some embodiments a speech input (or other user interface modality) may be used to trigger operations.

Figure 5:
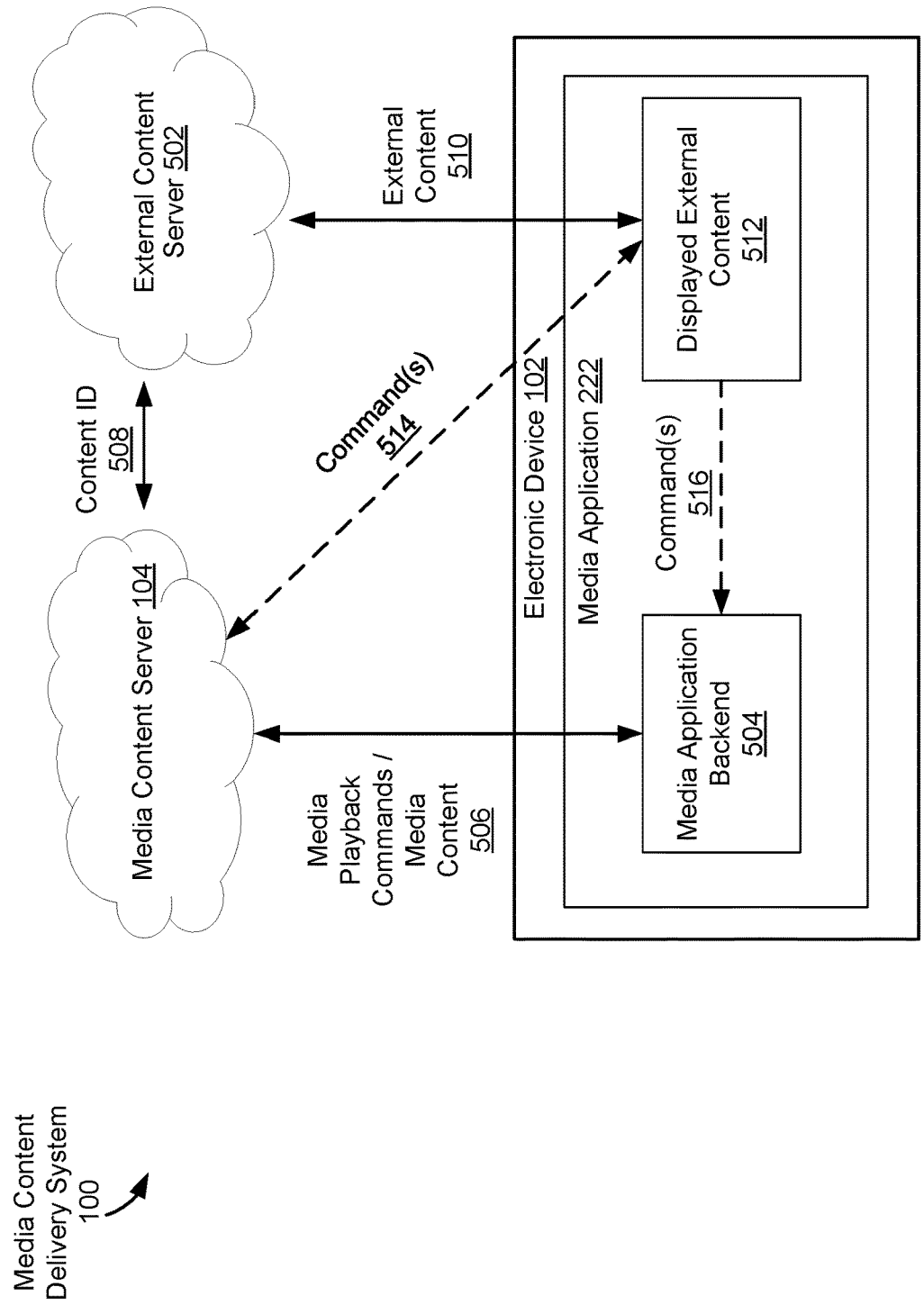
FIG. 5 is a block diagram illustrating communication between content servers and an electronic device, in accordance with some embodiments.

FIG. 5 is a block diagram illustrating the communication between the media content server 104 (e.g., a server system), an external content server 502 (e.g., a server system), and an electronic device 102. In some embodiments, while the media application 222 is executing on electronic device 102, the media application backend 504 sends media playback commands (e.g., in accordance with user inputs selecting or controlling a media content item for playback) to media content server 104, and media content server 104 sends media content 506 to the media application backend 504 (e.g., for playback by the electronic device 102).

In some embodiments, in accordance with a determination (e.g., by media content server 104 and/or media application backend 504) that external content is to be displayed by the media application, the media content server 104 and/or media application request, from external content server 502, the external content item(s) (e.g., identified by a content ID 508). In some embodiments, the media content server 104 identifies an external content provider, and the external content provider selects which external content item to provide from its external content server 502. In some embodiments, the external content server 502 sends the external content 510 to the electronic device 102 (e.g., directly and/or via the media content server 104) for display. In some embodiments, while the external content is displayed 512 by the electronic device (e.g., within the media application 222), in response to a user input selecting a control, command(s) 516 that correspond to the control are passed to the media application backend 504 and/or command(s) 514 are passed to the media content server 104. In some embodiments, in response to the command(s), the media content server 104 and/or the media application backend 504, at the electronic device 102, performs one or more actions in accordance with the command(s) (e.g., provides content, begins playback, and/or updates display of the media application). For example, the actions include playing, pausing, skipping, and adding as a favorite, a media item that is presented in the external content view. In some embodiments, the actions include opening an external browser (e.g., in response to selecting "Learn More" control), initiating a sharing protocol (e.g., to share the external content with other users), and/or dismissing the external content view.

Figure 6B:
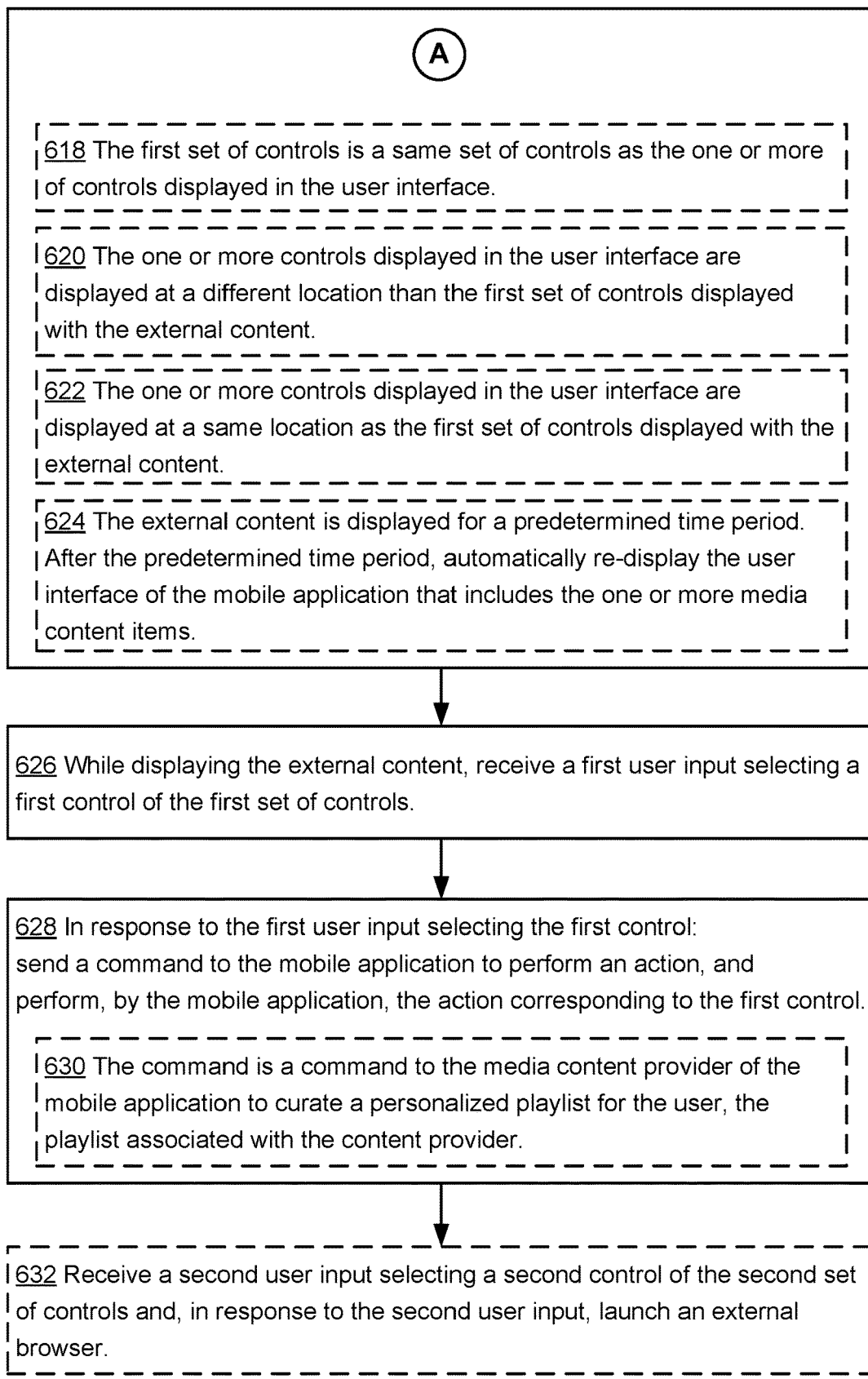

FIGS. 6A-6B are flow diagrams illustrating a method 600 of performing actions in a mobile application from commands generated within external content, in accordance with some embodiments. Method 600 may be performed at an electronic device (e.g., media content server 104 and/or electronic device(s) 102) having one or more processors and memory storing instructions for execution by the one or more processors. In some embodiments, the method 600 is performed by executing instructions stored in the memory (e.g., memory 212, FIG. 2, memory 306, FIG. 3) of the electronic device. In some embodiments, the method 600 is performed by a combination of the server system (e.g., including media content server 104 and CDN 106) and a client device.

Referring now to FIG. 6A, in performing the method 600, the electronic device displays (602), in a mobile application provided by a media content provider, a user interface that includes one or more media content items. In some embodiments, the mobile application includes a currently playing view (e.g., as illustrated in FIG. 4A), a playlist view (e.g., an ordered list with a plurality of media content items), a home view (e.g., for displaying recommended content), a search view (e.g., for searching for one or more media content items), and user-selectable options for navigating between the views, including selecting one or more media content items to be played back.

In some embodiments, the electronic device receives, while displaying the user interface of the mobile application, from a server system, a command to display external content (e.g., an advertisement or other external content associated with an external content provider that is distinct from the media content provider associated with the mobile application). In some embodiments, the command to display external content is generated at the server system in accordance with a session of the user of the mobile application satisfying one or more conditions. For example, in accordance with a determination that the session of the user is a free user account (or is not a premium (e.g., paid) user account), and/or that the user has consumed a threshold amount of media content (e.g., a threshold number of media content items, a threshold amount of time, and/or a threshold number of skips for media content), the server system identifies external content to be presented to the user. In some embodiments, the server system sends the external content to the electronic device for display within the mobile application, as displayed below. In some embodiments, the server system sends the electronic device an indication of the external content (e.g., a URL) and the electronic device retrieves the external content using the indication received from the server system. For example, the external content is a microsite associated with an external content provider distinct from the media content provider. In some embodiments, the server system identifies an external content provider (e.g., a third-party content provider) that provides the external content and sends, to a server system of the identified external content provider, an indication of the electronic device, such that the server system of the external content provider selects and provides external content to the electronic device.

In some embodiments, displaying the user interface in the mobile application includes (604) displaying one or more controls for controlling playback of the one or more media content items. For example, controls 404 in FIG. 4A are displayed in the user interface 402 of the mobile application.

In some embodiments, the one or more controls comprise (606) sharing controls for sharing a media content item provided by the media content provider. For example, the sharing control 408 in FIG. 4A enables a user to share a currently playing media content item with other users (or other individuals) using, for example, a messaging application.

In some embodiments, the one or more controls comprise (608) a control for marking a media content item as a favorite, and the mobile application stores, in a user profile, the media content item as a favorite. For example, selection of the heart icon in controls 404 causes the mobile application (e.g., and a server system of the media content provider) to store the currently playing media content item as a favorite for the user. In some embodiments, the media content provider generates a list of media content items that the user has marked as a favorite.

The electronic device displays (610), within a browser displayed within the mobile application (e.g., in a Webview), external content (e.g., a microsite) that is associated with a content provider distinct from the media content provider, including displaying a first set of controls within the external content. In some embodiments, the first set of controls (e.g., controls 430, FIG. 4B) are controls for controlling the mobile application. For example, controls 430 displayed within external content 420 include a same set of controls as controls 404 displayed in the user interface of the mobile application for controlling playback of media content provided by the mobile application. In some embodiments, the first set of controls include controls that are not displayed by the user interface of the mobile application, (e.g., the first set of controls are designed and/or provided by the external content within the browser), but correspond to commands within the mobile application. For example, "listen now" control 424 (e.g., an affordance) is a control in the first set of controls that is not displayed by the user interface of the mobile application in FIG. 4A, but provides control of media content from the media content provider (e.g., a running playlist).

In some embodiments, the content provider selects (612) the first set of controls to be displayed within the external content from a library of controls provided by the media content provider distinct from the content provider. For example, the first set of controls displayed in FIG. 4B, are selected by the external content provider as controls to be included in the microsite. In some embodiments, the media content provider provides the external content provider with a list of approved controls, such that the external content provider is enabled to create the external content using controls from the list of approved controls. For example, a first external content provider selects to include a "listen now" control 424 (e.g., to control playback of a playlist, "Running Playlist"), and excludes one or more other controls in the list of approved controls (e.g., because the external content provider does not want to include all of the controls in the list of approved controls).

In some embodiments, the first set of controls comprises (614) a set of playback controls for controlling playback, of a media content item provided by the media content provider. For example, controls 430 (FIG. 4B) include playback controls such as heart (e.g., mark as favorite), back, pause, skip, and shuffle. In some embodiments, the first set of controls are displayed while displaying the external content (e.g., within the external content). For example, playback controls 430 are displayed in the external content illustrated in FIG. 4B at a different position in the user interface than the playback controls 404 displayed in the mobile application of the media content provider.

In some embodiments, the first set of controls corresponds (616) to a set of actions executed by the mobile application (e.g., and that are not executable by the content provider). For example, playback controls for media content items in the mobile application are not controllable by the external content provider. Instead, the mobile application controls playback of the media content items.

In some embodiments, the first set of controls is (618) a same set of controls as the one or more of controls. For example, the first set of controls (e.g., controls 430) illustrated in FIG. 4B are the same set of controls 404 illustrated in FIG. 4A. In some embodiments, the first set of controls include one or more additional controls than the one or more controls (e.g., control 424 corresponds to an additional control displayed in the browser but not displayed in the user interface of the mobile application). In some embodiments, the same set of controls are displayed at different locations within the user interface (e.g., controls 404 are displayed in a different portion of the user interface than controls 430).

In some embodiments, the one or more controls displayed in the user interface are displayed (620) at a different location than the first set of controls displayed with the external content. In some embodiments, a content creator of the external content includes the first set of controls at different locations within the user interface. For example, the content creator is enabled to design the user interface of the browser to include (or exclude) controls, and to display the controls at different positions within the browser.

In some embodiments, the one or more controls displayed in the user interface are displayed (622) at a same location as the first set of controls displayed with the external content.

In some embodiments, the external content is displayed (624) for a predetermined time period (e.g., a 30-second advertisement, or a predefined duration for display (e.g., 10 seconds, or until media content of the external content has completed playback)) and, after the predetermined time period, the electronic device automatically re-displays the user interface of the mobile application that includes the one or more media content items. For example, if the user does not interact with the external content (e.g., does not select any controls or affordances in the external content), the electronic device ceases display of the external content (e.g., without user input) and displays the user interface of the mobile application that was displayed before the external content (e.g., the user interface illustrated in FIG. 4A is redisplayed). In some embodiments, the electronic device re-displays the user interface of the mobile application in response to the user selecting the "dismiss" affordance displayed in the external content.

While displaying the external content, the electronic device receives (626), from a user, a first user input selecting a first control of the first set of controls. In some embodiments, the first user input is a voice command. In some embodiments, the first user input is a tap input selecting the first control (e.g., "Listen Now" control 424 is selected by the user).

Figure 4C:
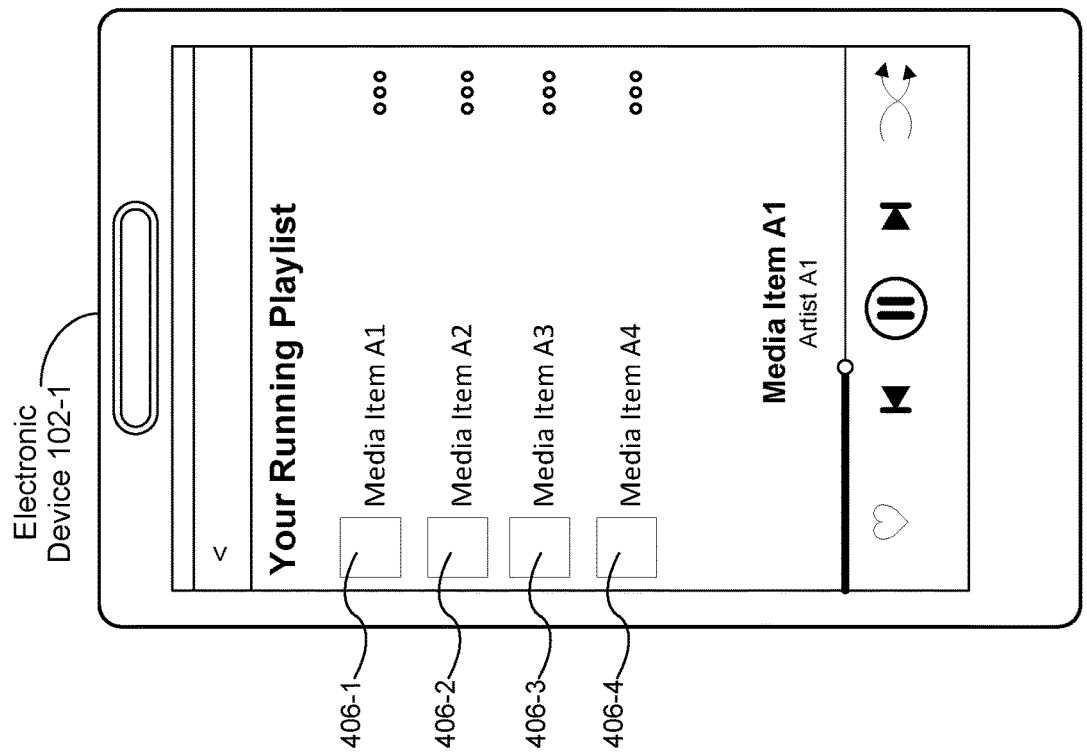

In response to the first user input selecting the first control, the electronic device sends (628) a command to the mobile application to perform an action and performs, by the mobile application, the action corresponding to the first control. For example, as described with reference to FIG. 4B, the user selects control 424 to "Listen Now" to the Running Playlist, and in response to the user selection, a personalized running playlist for the user is displayed and played back, as illustrated in FIG. 4C. In some embodiments, the action comprises controlling playback of a media content item presented by the mobile application (e.g., play, pause, skip, back, favorite, etc.) (e.g., in response to user selection of one or more of controls 430). In some embodiments, performing the actions comprises sending, from the electronic device, a request to the server system (e.g., of the media content provider) and receiving, from the server system, one or more content items in response to the request.

In some embodiments, the command is (630) a command to the media content provider of the mobile application to curate (e.g., select, based on one or more criteria) a personalized playlist for the user, the playlist associated with the content provider. In some embodiments, the playlist is personalized in that it differs from playlists generated for other users based on information obtained from a user profile of the user (e.g., a listening history). For example, in response to the user selecting "Make me a running playlist" control 422 in FIG. 4B, the provider of the mobile application curates a personalized "Running" playlist for the user, without the external content provider providing information about the user (e.g., because the user is already logged into and authenticated with the mobile application). This enables the mobile application to provide personalized content for the user without requiring the user to input login credentials. For example, typical WebViews are provided by an independent external content provider, such that the external content provider does not have access to the user's login credentials and must request that the user logs in before providing personalized content for the user.

In some embodiments, the electronic device receives (632) a second user input selecting a second control of the first set of controls; and in response to the second user input, launches an external browser (e.g., a browser that is not run within the application, for example, a browser that is native to the device's operating system). For example, the "Learn More" control illustrated in FIG. 4B, in response to selection of the control, causes the device to launch an external website and/or web browser that is outside of the mobile application.

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

FIG. 7 is a flow diagram illustrating a method of performing actions in a mobile application from commands generated within a microsite displayed within the mobile application, in accordance with some embodiments. In some embodiments, method 700 represents a similar approach to method 600, except that method 700 may be used for content built by the media-providing service that operates the mobile application. In one example, such an approach may be advantageous for incorporating infrequently-used user interfaces through a browser window within the application (e.g., the webpage need not include external content). For example, the media-providing service may provide a "Year in Review" feature summarizing the songs, artists, and other content that a user listened to most frequently in the past year. Rather than designing a user interface for such infrequently used features and incorporating the user interface directly into the application, some embodiments of the present disclosure provide such features via a webpage, which is launched in a browser within the media application (e.g., a Webview), and through which bi-directional communication is exchanged between the webpage and media application. This converts the more difficult task of incorporating a user interface into an application to the easier task of loading a webpage. In some embodiments, the look and feel of the browser within the media application as well as the webpage match the mobile application user interface, such that the user is not aware that a webpage is displayed (rather than the application itself).

As another example, in some circumstances, a third-party partner (e.g., advertiser) may provide assets (e.g., image and brand assets) to the media-providing service, and the media-providing service builds a custom experience for the third-party partner, which with the user may interact, in the form of a microsite to be displayed within the mobile application. In some circumstances, the user will have already logged into the media-providing service through the mobile application. Thus, the media-providing service may pass authentication information to the microsite, such that the microsite is able to customize the third-party partner's experience within the application to the user using user profile information stored by the media-providing service (e.g., without the need for the user to re-authenticate within the microsite). The microsite is further enabled to, through bi-directional communication, provide the interaction data to the media-application (e.g., data collection from interactions with the content displayed in the microsite are sent to the mobile application, such that the data becomes first-party data for the mobile application). This communication of interaction data to the mobile application obviates the need for cookies, since the user is already logged into/authenticated within the mobile application. Further, because the present embodiments obviate the need for cookies, it is unnecessary to display a banner requesting the user's permission to use cookies, which would negatively impact the look and feel of the experience, as displayed in the mobile application (in some circumstances, the look and feel of the microsite is integrated into the mobile application such that the user would not be aware that content is displayed via a microsite as opposed to natively within the application).

In some embodiments, a link to the microsite can be provided outside of the mobile application (e.g., in an email, a search result, a social media message, etc.). In some embodiments, when a user selects a link to the microsite through the user's mobile device, the microsite will launch in the mobile application, if the mobile application is installed. In some embodiments, if the mobile application is not installed, the device is automatically redirected to a 3rd party application download service, so as to allow the user to download and install the required mobile application. In some embodiments, if the mobile application is not installed, the microsite will load through an external web browser, but with somewhat different functionality (e.g., without the bidirectional communication, customization of the experience, etc.).

To that end, in accordance with some embodiments, a method performed at an electronic device is provided. The method includes displaying (702), in a mobile application provided by a media content provider, a user interface that includes one or more media content items (e.g., as described with reference to operation 602, method 600).

The method further includes displaying (704), within a browser displayed within the mobile application, a webpage that includes content and a first set of controls (e.g., the first set of controls are part of the webpage). In some embodiments, the webpage is a microsite. In some embodiments, the microsite is integrated with the look and feel of the mobile application (e.g., such that it is not apparent to a user that a microsite is displayed in the mobile application). In some embodiments, the controls control playback of media within the media-providing service (as described with respect to operation 604, method 600).

The method includes, while displaying the webpage, receiving (706) a first user input selecting a first control of the first set of controls. In some embodiments, the first user input constitutes user interaction data. In some embodiments, the webpage (e.g., microsite) is enabled to provide the user interaction data to the mobile application, thus enabling the mobile application to obtain user interaction data through a webpage without the use of cookies.

The method includes, in response to the first user input selecting the first control, sending (708) a command to the mobile application to perform an action and performing (710), by the mobile application, the action corresponding to the first control.

It will be apparent to one of skill in the art that method 700 may include any of the operations or features of method 600. For brevity, these details are not repeated here.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at an electronic device:
displaying, in a mobile application provided by a media content provider, a user interface that includes one or more media content items provided by the media content provider, wherein the mobile application includes authentication information associated with user profile information;
displaying, within a browser displayed within the mobile application, external content that is associated with an external content provider distinct from the media content provider, including displaying a first set of controls within the external content, wherein the external content provider selects the first set of controls to be displayed within the external content from a library of controls provided by the media content provider, wherein the browser receives the authentication information from the mobile application via bi-directional communication between the browser and the mobile application;
while displaying the external content, receiving, from a user, a first user input selecting a first control of the first set of controls displayed within the external content; and
in response to the first user input selecting the first control displayed within the external content:
sending a command from the browser to the mobile application via the bi-directional communication between the browser and the mobile application to perform an action associated with the one or more media content items provided by the media content provider, wherein the command is a command to the media content provider of the mobile application to curate a personalized playlist for the user that is based on information obtained from the user profile information, the personalized playlist associated with the external content provider; and
curating, by the mobile application, the personalized playlist for the user.

2. The method of claim 1, wherein the first set of controls comprises a set of playback controls for controlling playback of a media content item provided by the media content provider.

3. The method of claim 1, wherein the first set of controls corresponds to a set of actions executed by the mobile application.

4. The method of claim 1, wherein displaying the user interface in the mobile application includes displaying one or more controls for controlling playback of the one or more media content items.

5. The method of claim 4, wherein the first set of controls is a same set of controls as the one or more of controls.

6. The method of claim 4, wherein the one or more controls comprise sharing controls for sharing a media content item provided by the media content provider.

7. The method of claim 4, wherein the one or more controls comprise a control for marking a media content item as a favorite, and the mobile application stores, in a user profile, the media content item as a favorite.

8. The method of claim 4, wherein the one or more controls displayed in the user interface are displayed at a different location than the first set of controls displayed with the external content.

9. The method of claim 4, wherein the one or more controls displayed in the user interface are displayed at a same location as the first set of controls displayed with the external content.

10. The method of claim 1, further comprising:
receiving a second user input selecting a second control of the first set of controls; and
in response to the second user input, launching an external browser.

11. The method of claim 1, wherein:
the external content is displayed for a predetermined time period; and
after the predetermined time period, automatically re-displaying the user interface of the mobile application that includes the one or more media content items.

12. The method of claim 1, further comprising:
prior to displaying, in the mobile application provided by the media content provider, the user interface that includes one or more media content items, detecting a user input directed to a link displayed external to the mobile application,
wherein the external content is displayed within the mobile application in response to the user input directed to the link displayed external to the mobile application.

13. The method of claim 1, including obtaining, by the mobile application, data from user interactions with the external content.

14. The method of claim 1, wherein the browser receives the authentication information from the mobile application without requiring user input.

15. The method of claim 1, wherein the authentication information includes the user profile information and the external content is customized based on the user profile information.

16. An electronic device, comprising:
one or more processors; and
memory storing one or more programs, the one or more programs including instructions for:
displaying, in a mobile application provided by a media content provider, a user interface that includes one or more media content items provided by the media content provider, wherein the mobile application includes authentication information associated with user profile information;
displaying, within a browser displayed within the mobile application, external content that is associated with an external content provider distinct from the media content provider, including displaying a first set of controls within the external content, wherein the external content provider selects the first set of controls to be displayed within the external content from a library of controls provided by the media content provider, wherein the browser receives the authentication information from the mobile application via bi-directional communication between the browser and the mobile application;

while displaying the external content, receiving, from a user, a first user input selecting a first control of the first set of controls displayed within the external content; and in response to the first user input selecting the first control displayed within the external content:

sending a command from the browser to the mobile application via the bi-directional communication between the browser and the mobile application to perform an action associated with the one or more media content items provided by the media content provider, wherein the command is a command to the media content provider of the mobile application to curate a personalized playlist for the user that is based on information obtained from the user profile information, the personalized playlist associated with the external content provider; and curating, by the mobile application, the personalized playlist for the user.

17. A non-transitory computer-readable storage medium storing one or more programs for execution by an electronic device with one or more processors, the one or more programs comprising instructions for:

displaying, in a mobile application provided by a media content provider, a user interface that includes one or more media content items provided by the media content provider, wherein the mobile application includes authentication information associated with user profile information;

displaying, within a browser displayed within the mobile application, external content that is associated with an external content provider distinct from the media content provider, including displaying a first set of controls within the external content, wherein the external content provider selects the first set of controls to be displayed within the external content from a library of controls provided by the media content provider, wherein the browser receives the authentication information from the mobile application via bi-directional communication between the browser and the mobile application;

while displaying the external content, receiving, from a user, a first user input selecting a first control of the first set of controls displayed within the external content; and in response to the first user input selecting the first control displayed within the external content:

sending a command from the browser to the mobile application via the bi-directional communication between the browser and the mobile application to perform an action associated with the one or more media content items provided by the media content provider, wherein the command is a command to the media content provider of the mobile application to curate a personalized playlist for the user that is based on information obtained from the user profile information, the personalized playlist associated with the external content provider; and curating, by the mobile application, the personalized playlist for the user.

\* \* \* \* \*